Patented Oct. 21, 1941

2,259,496

UNITED STATES PATENT OFFICE 2,259,496

COPOLYMERIZATION OF POLYCYCLOPENTADIENE AND STYRENE

Frank J. Soday, Upper Darby, Pa., assignor to The United Gas Improvement Company, a corporation of Pennsylvania No Drawing. Application July 23, 1938,
Serial No. 221,023

14 Claims. (Cl. 260—86)

This invention pertains generally to the polymerization of unsaturated compounds and pertains particularly to the co-polymerization of such compounds.

The invention pertains more particularly to co-polymerizing benzene soluble polymerized cyclopentadiene and unpolymerized styrene.

Cyclopentadiene may be polymerized into at least two broad types of polymers one of which is characterized by being soluble in solvents such as benzene, toluene, chloroform, carbon tetrachloride and high flash naphtha, while the other of which is characterized by being insoluble in these solvents. For convenience the former type of polycyclopentadiene will be referred to herein as soluble polycyclopentadiene.

A manner of obtaining soluble polycyclopentadiene will be hereinafter described

There are various sources of styrene. Among these is the ligth oil obtained upon distillation of tar produced in the manufacture of carburetted water gas or oil gas. In addition, styrene may be obtained from coal tar, drip oil and from cracked petroleum products in general, as well as synthetically.

With ordinary methods of fractional distillation as now practiced it is impossible to separate the styrene from light oil in a substantially pure state because of the presence of other materials which apparently are either of similar boiling point or are capable of forming azeotropic mixtures with styrene.

For instance, a typical styrene fraction obtained by ordinary distillation processes from light oil will contain hardly more than 50% to 65% styrene, and other fractions such as forerunnings and afterrunnings will contain substantially less styrene.

Therefore, while pure styrene, diluted or not with a solvent, may be employed, the invention is especially useful in that it is also capable of utilizing styrene fractions of various concentrations obtained by distillation from light oil and from other sources of styrene and including relatively dilute styrene fractions.

The following examples will serve to further illustrate the invention.

Example 1

42.9 grams of a solution of polycyclopentadiene in toluene and containing 6.4 grams of polycyclopentadiene was mixed with 1.07 grams of a 62.2% solution of styrene containing 0.67 gram of styrene. The styrene solution was a fraction obtained in the distillation of light oil from carburetted water gas tar.

The mixture was placed in a glass bomb and sealed in an atmosphere of nitrogen.

The bomb was then heated for 4 days at a temperature of 145° C.

43.56 grams of a solution containing 8.91 grams of the desired resin was thus obtained.

The yield obtained was somewhat above the theoretical which indicates that a portion of the solvent may have reacted and became a part of the resin molecule.

Example 2

250 grams of a solution of polycyclopentadiene in toluene and containing 28.1 grams of polycyclopentadiene was mixed with 4.6 grams of a 64.45% solution of styrene containing 2.97 grams of styrene. The styrene solution was a fraction obtained in the distillation of light oil from carburetted water gas tar.

The mixture was placed in a glass bomb and sealed in an atmosphere of nitrogen.

The bomb was then heated for 10 days at a temperature of 100° C.

254.6 grams of a solution containing 30 grams of the desired resin was thus obtained.

Example 3

36.9 grams of a solution of polycyclopentadiene in toluene and containing 5.35 grams of polycyclopentadiene were mixed with 8.02 grams of a 66.7% solution of styrene containing 5.35 grams of styrene. The styrene solution was a fraction obtained in the distillation of light oil from carburetted water gas tar.

The mixture was put in a glass bomb sealed in an atmosphere of nitrogen, and heated for 10 days at a temperature of 100° C.

42.6 grams of solution containing 9.3 grams of the desired polymer were obtained.

A tin coated strip of sheet metal was dipped in the above mentioned solution, air dried for 5 minutes, and baked for 15 minutes at a temperature of 150° C. The metal strip was then coated with a solution of "Vinylite" and dried by baking at suitable temperatures. A "Vinylite" coating of 5.78 milligrams per square inch resulted. The metal strip was then sterilized 15 minutes in a steam atmosphere with 11–12 pounds of steam pressure.

The resulting film was subjected to extremely severe tests for cohesion and adhesion and was found to be highly satisfactory.

Example 4

567 grams of a solution of polycyclopentadiene in toluene and containing 94.7 grams of polycyclopentadiene were mixed with 62.3 grams of a 52.4% solution of styrene containing 32.6 grams of styrene. The styrene solution was a fraction obtained in the distillation of light oil from carburetted water gas tar.

The mixture was placed in a stainless steel bomb and sealed in an atmosphere of nitrogen.

The bomb was then heated for 7 days at a temperature of 100° C.

629.3 grams of a solution containing 121.3 grams of the desired resin was thus obtained.

While in the above specific examples toluene is used as a polymerization medium, it is to be understood that solvents in general may be employed of which benzene, xylene, ethyl benzene, solvent naphtha, petroleum naphtha, carbon tetrachloride, decalin, triethylbenzene and ethylene dichloride are examples.

Resin compounds prepared as illustrated in the above examples exhibit, among other things, outstanding properties as coating materials.

Among the suggested uses for polymerization or condensation products is that of the coating of metal food containers such as those commonly known as "tin cans."

It is a well recognized fact that a tin coating for cans is in many instances unsatisfactory, even though the containers are hermetically sealed. In the case of grape juice for instance, tin is dissolved on long standing to degrade the product and should the smallest hole develop in the tin lining a reaction is set up which soon finds its way to the outer surface of the can, thus causing it to leak.

Other food stuffs are known to dissolve or react chemically or to be otherwise affected by the tin lining, for instance modified in taste, or odor and the art has long sought a solution for this difficult problem.

For example, some foods develop hydrogen sulfide on standing. In the case of a tin coated can a reaction is set up whereby tin sulfide is formed. On the other hand, if the can is uncoated, iron sulfide is formed.

It is the custom after a can has been sealed to subject it and its contents to a sterilization treatment with heat. This increased temperature greatly accelerates any reactions that are capable of taking place.

The introduction of the sealed can in the beverage trade has increased enormously the demand for a completely inert lining incapable of modifying the taste of the beverage. This applies particularly in the case of beer.

As a result of the foregoing the art has sought to find a lacquer which might be applied over or substituted for the tin coating. It was found, however, that lacquers taken generally either failed to form a suitable bond with the metal surface so as to adhere firmly thereto, or if a proper bond was formed they failed to resist reaction with foods.

This led to the adoption of a procedure whereby a lacquer having good bonding properties was used as a primer for a top coat comprising a second lacquer having proper food resisting properties. This in turn presented the further problem of finding two such lacquers which would bond properly with each other. The desired lacquer should, therefore, preferably have universal bonding properties.

Since it is desirable to apply the lacquer coating to the sheet metal before the can or other object or part is made up, the bonding properties of the lacquer must be such as to withstand bending, pressing, shaping, stamping, and so forth, without cracking or losing adhesion.

A common test is to subject a strip of coated sheet metal to considerable stretching during which the lacquer must not crack or lose adhesion, but must stretch with the metal ihile adhering firmly thereto.

Such test may be performed for instance by coating a tin panel, of any convenient dimensions such as 2 x 3 inches, on one surface with a solution of the resin in a suitable solvent. The quantity applied is conveniently such that the final film after baking will have a weight of from 9 to 11 milligrams per square inch. The temperature of baking is for convenience 140° C. After baking for one hour and cooling the coated tin panel is bent backwardly on itself over a mandrel $\frac{1}{32}$ inch in diameter through an angle of 180° with the coated surface outward. The ends are then bent back into the same plane. The film must be capable of repeatedly withstanding this manipulation without striation, loss of adhesion, surface cracking or checking, or apparent optical change.

A considerably more severe test is to double cross hatch the film before or after bending in the manner described in the preceding paragraph. The cross hatching may be accomplished by using a sharp object such as a knife. An adhesive tape, such as that known commercially as scotch cellulose tape, is then firmly applied to the surface and removed with a jerk. A film that withstands this test is perfect from the standpoint of adhesion and cohesion.

In addition to the foregoing the lacquer coating must also have an acceptable appearance, preferably suggesting utmost cleanliness. This is because the usual housewife looks with great disfavor upon any discoloration of the inside surface of a can when removing food therefrom.

In this connection many lacquers develop a cloudiness during the sterilization step generally referred to as blushing. The resulting discoloration is very undesirable.

The lacquer also should be completely odorless and tasteless in order not to impair the flavor or odor of the canned food product in any way.

Surface films having all of the above desirable properties with none of the undesirable may be produced by applying to surfaces in general, and metal surfaces such as tin and iron in particular, a liquid coating composition having as a base my new resin, and then baking or air drying the coating thus applied, or permitting it to dry in any other atmosphere.

For example, films prepared by applying to tin plate a solution of my new resin in a suitable solvent, for instance, toluene, followed by baking for a period of one hour at 140° C. show excellent coherence and adherence even after repeated bending over a mandrel $\frac{1}{32}$ inch in diameter, and the application of the cross hatching-adhesive tape test.

These films also show excellent alkali and water resistance, do not become brittle with age and are relatively highly resistant to abrasion.

Examples of the application of my new resin to the coating of surfaces are as follows:

*Example 5*

A 15% solution of my new resin in toluene is applied to tin plate or to a tin plated fabricated object or other surface, such as of glass, iron, steel, zinc, magnesium, copper, aluminum, stainless steel, lead, nickel, chromium, etc., or of alloys containing one or more of these metals in such quantities that the final resin film, whether applied in one coat or several coats with or without intermediate drying, will have a desired thickness such as from 9 to 11 milligrams per square inch of dry resin.

Since drying is usually hastened by baking, the coated object is placed in an oven and heated to a suitable temperature such as between 50° C. and 250° C. for a sufficient period to insure satisfactory drying. However, if desired, the coated object may be dried without the application of heat.

A suitable baking time is found to be between 15 minutes and 60 minutes.

Sheet metal thus coated is ready for the manufacture of objects such as cans or other containers, bottle caps, screw caps, and in fact objects of any character. It will withstand the roughest treatment such as sharp bending, stamping, stretching, and so forth without cracking, loosening, or other injury to the coating.

The resin also may be used for coating wood, fiber board, asbestos, veneer, ceramic ware, concrete, bricks, and other building materials.

The use of my new resin is by no means restricted to the formation of a single film system. For instance, it may be used as a primer coat for another resinous coating compound of lesser bonding qualities, for example the polymerized vinyl compounds as shown by the following example. On the other hand, it may be used as a top coat applied over some other primer coating.

*Example 6*

A tin plated sheet or other suitable metal sheet or fabricated object is coated with a solution of my new resin in a suitable solvent, say toluene, in sufficient quantities to secure a desired final coating weight after drying, say of approximately 5 milligrams per square inch.

To hasten drying the coated sheet is placed in an oven and baked at a temperature of say between 50 C. and 250° C. for from 15 minutes to 60 minutes.

A suitable coat or series of coats of polymerized vinyl compound may then be applied followed by baking.

A suitable final coat is of such thickness that the combined film, that is the film of my new resin and the film of polymerized vinyl compound, has a total thickness equivalent to from 8 to 11 milligrams per square inch.

Polymerized vinyl compounds are well known in the art. For instance, a typical vinyl compound is made by polymerizing a solution containing 85% vinyl chloride and 15% vinyl acetate on the undiluted basis using benzoyl peroxide as catalyst with mild heat.

While the film thicknesses given are found to be suitable for the purpose, and particularly for food containers, other film thicknesses may obviously be employed without departing from the spirit of the invention.

The following is an example of a varnish made with my new resin.

*Example 7*

The materials employed and quantities of the same are as follows:

| | Parts |
|---|---|
| Styrene-polycyclopentadiene resin | 1118 |
| China-wood oil | 1283 |
| Mineral spirits | 2400 |
| Drier, q. s. | |

The China-wood oil is heated in a suitable metal kettle to 400° F. during a period of 5 minutes, and then heated from 400° F. to 560° F. during a period of 10 minutes, and held at this temperature for an additional 3 minutes. It is allowed to cool to 535° F., held at this temperature for a period of 2 minutes, and chilled to 400° F. by the addition of the resin. The varnish is then reduced by the addition of the mineral spirits.

While any proportion of soluble polycyclopentadiene to styrene may be employed in making my new resin, I prefer in the case of coating compositions to employ between 50% and 99% soluble polycyclopentadiene on the undiluted basis to between 1% to 50% monomeric styrene on the undiluted basis. 85% to 95% polycyclopentadiene to 5% to 15% monomeric styrene is very suitable.

The resin obtained by polymerizing a mixture containing 90 parts of soluble polycyclopentadiene to 10 parts of monomeric styrene is excellent.

On the other hand, in the case of casting or molding compositions I prefer to employ between 50% and 99% monomeric styrene to between 1% to 50% soluble polycyclopentadiene on the undiluted basis. 85% to 95% monomeric styrene to 5% to 15% soluble polycyclopentadiene is very suitable.

The above test for cohesion and adhesion of the applied film to metal surfaces increases in severity with increase in thickness of the film.

A film on tin plate formed with resin obtained upon the polymerization of a solution containing 90 parts of soluble polycyclopentadiene to 10 parts of monomeric styrene for 4 days at a temperature of 145° C., showed excellent cohesion and adhesion even when the coating weight was increased to 18 milligrams per square inch.

Another film on tin plate formed with resin obtained by polymerizing a solution containing 90 parts of soluble polycyclopentadiene to 10 parts of monomeric styrene for 10 days at 100° C. showed excellent cohesion and adhesion even though the film thickness was increased to 21.5 milligrams per square inch.

While polymerization may be carried out at any suitable temperature, I find temperatures between 50° C. and 250° C. satisfactory, and prefer to employ temperatures between 75° C. and 200° C.

On the other hand, a catalyst comprising a metallic halide such as tin chloride, zinc chloride, boron trichloride, ferric chloride, aluminum chloride, and boron trifluoride, a metallic halide organic solvent complex, such as $AlCl_3$ organic solvent complex, aluminum bromide organic solvent complex, zinc chloride organic solvent complex, boron trifluoride organic solvent complex, boron chloride organic solvent complex, or an organic peroxide such as pinene peroxide or benzoyl peroxide, or activated clay, activated carbon, activated alumina, silica gel, diatomaceous earth, ultra sonics and/or ultra violet light might be substituted for or combined with heat for carrying out the polymerization.

I prefer to carry out the polymerization in the presence of an inert gas such as carbon dioxide or nitrogen or in the presence of solvent vapors, or in a vacuum to avoid the formation of insoluble gels which are more readily formed in the presence of oxygen. In general, the exclusion of oxygen from the material during and after the polymerizing process will prevent the formation of insoluble compounds.

While I prefer to utilize these resinous materials in the form of solutions because of their pronounced tendency to form insoluble polymers upon exposure to air for any length of time, I wish to point out that the solvent can be removed from these resins by careful distillation either with or without a reduction in pressure. Such distillation, however, is preferably carried out in an inert atmosphere.

The addition of certain anti-oxidants to solutions of the resin, such as dipentene, pyrogallol, hydroquinone, p-tertiary butyl catechol and 2-4 diamino phenol dihydrochloride inhibit the formation of insoluble materials apparently indefinitely as well as improve films prepared from the resins. The mechanism involved is apparently a regulation of the amount of oxygen absorbed by the film during the drying and baking process.

While my new resin is ideally suited to the coating of surfaces in general and particularly to the coating of metal surfaces such as those of food containers as referred to above, it may be used for many other purposes for instance, for lacquers generally, for varnishes either alone or in admixture with other resins, for enamels, for paints, or in fact for coating compositions generally. It is also well suited for casting or molding purposes in which it may be employed alone or in admixture with other plastics or resins, either with or without the addition of suitable fillers such as wood flour, cotton linters, leather findings, mica, cloth fragments, canvas pieces, diatomaceous earth, and the like. In fact since the material is quick-setting it might be used as a drier.

A method for producing soluble polycyclopentadiene is described and claimed in my copending application Serial Number 204,786, filed April 28, 1938, from which the following example is taken. It is to be understood, however, that soluble polycyclopentadiene obtained from any other source might be substituted.

*Example 8*

0.30 cubic centimeter of aluminum chloride-diethyl ether complex are added to 60 grams of toluene with thorough agitation to form a suspension, emulsion or solution.

A mixture of 20 grams of cyclopentadiene and 20 grams of toluene are added to the suspension during the courses of 12 minutes, the temperature ranging from 26–49° C. during the addition. The mixture is then agitated for an additional hour, after which 1 cubic centimeter of water is added. This is followed by agitation for 15 minutes.

10 grams of quicklime (CaO) are now added to the reaction mixture followed by agitation for an additional hour.

5 grams of a suitable filter aid are then added, and the mixture filtered.

A filtered solution containing 16.4 grams of polycyclopentadiene is thus obtained.

Generally speaking, any other aluminum chloride-organic solvent complex might be substituted. Examples of these are aluminum chloride-benzene complex, aluminum chloride-toluene complex, aluminum chloride-pentene complex, aluminum chloride-decene complex, aluminum chloride-phenyl methyl ether complex, aluminum chloride-phenyl ethyl ether complex, aluminum chloride-diisopropyl ether complex, aluminum chloride-isobutene complex, aluminum chloride-ethylene complex, aluminum chloride nitrobenzene complex, aluminum chloride-acetone complex, and aluminum chloride-benzoyl chloride complex.

In Example 8 it will be noted that both the cyclopentadiene and the catalyst are in diluted form before addition. Furthermore, diluted cyclopentadiene is preferably added to diluted catalyst rather than vice-versa to afford a better control of the speed and uniformity of the reaction and of the amount of heat evolved and consequently the type of polymer produced. The reaction runs smoother and is much more easily controlled on a large scale.

The addition of water to hydrolyze the catalyst makes it possible not only to completely remove the activity of the catalyst and thus stop the reaction at any point, but also makes it possible to remove the corrosive and discoloring acid constituents of the catalyst by a suitable alkali. The alkali is preferably added with the water used to hydrolyze the catalyst, although it may be added later if desired. The failure to substantially completely remove the catalyst and its hydrolysis products may be the cause of serious discoloration. The insoluble reaction products formed during the hydrolysis and neutralization remain behind on the filter leaving a highly purified filtrate.

The polycyclopentadiene may be used as such, or it may be concentrated in a vacuum still of suitable design to give a product containing any desired higher concentration of polycyclopentadiene including solid polycyclopentadiene, or it might be diluted to give any desired lower concentration, or a second solvent might be substituted such as a higher boiling solvent. This may be done either before or after concentration by adding the second solvent and distilling.

In Example 8 the particular temperatures were chosen to control the physical properties such as viscosity and color of the product. It will be noted that at no time did the temperature exceed 100° C. or even 70° C. The manner of combining the reactants, constant agitation, and brine cooling made it possible to prevent local overheating, and the formation of insoluble polymer.

In Example 8 (1) temperature, (2) concentration of cyclopentadiene, (3) proportion of uniformly distributed catalyst, and (4) reaction time may be varied considerably in the production of soluble polymer. If it is found that insoluble polymer is obtained, one or more of the four conditions, namely (1) temperature, (2) concentration of cyclopentadiene, (3) proportion of catalyst, and (4) reaction time should be reduced until the soluble polymer is obtained.

Carrying out the polymerization in the presence of a solvent makes it possible to have any desired concentration of cyclopentadiene.

While in Example 8 no dilution of the product was required to facilitate hydrolysis and/or filtering, it is to be understood that dilution with a solvent may be employed, if desired, particularly in the case of highly viscous products.

Generally speaking, for the formation of soluble polycyclopentadiene to the exclusion of insoluble polymer and of extreme discoloration, temperatures should rarely exceed 100° C., and preferably should not exceed 70° C., concentrations of cyclopentadiene should rarely exceed 50% by weight of the total solution except possibly at low temperatures, and concentrations of uniformly distributed catalyst should rarely exceed 25% by weight of cyclopentadiene although these values are not to be considered as fixed limits. By having extremely low values for one or two of the items mentioned the third might possibly exceed the value given. Should a short reaction time be employed, that is, a reaction time substantially less than one hour, all three items might possibly be higher, but perhaps with a sacrifice in yield and color.

It should be kept in mind that there are for practical purposes minimum values for temperature, concentration of cyclopentadiene, proportion of catalyst and time, which practice will show ought to be exceeded to obtain reasonable yields. For instance, I find that when using ordinary commercial toluene as the solvent at least 1.0 gram of aluminum chloride-ether complex per 100 grams cyclopentadiene is usually required. On the other hand, if the maximum values given in the previous paragraph for temperature, catalyst and cyclopentadiene were used simultaneously, insoluble polymer would be formed, even though the reaction time chosen were as short as good practice would permit.

It is by the observance of the preferred principles set forth herein that a quality soluble polycyclopentadiene is produced in good yield.

While in Example 8 toluene is used as a polymerization medium, it is to be understood that any other solvent may be substiuted of which benzene, xylene, ethyl benzene, solvent naphtha, petroleum naphtha, carbon tetrachloride, decaline, triethylbenzene and ethylene dichloride are especially suitable. The products with benzene and toluene are preferred for specific uses. Products with tetralin and pentene-2 are also very good.

While the use of pure cyclopentadiene in solution in a suitable solvent simplifies the system from the standpoint of the number of components present, solutions of crude cyclopentadiene in various states of purity might be used with various degrees of success depending upon the results desired.

Examples of crude cyclopentadiene are the cyclopentadiene containing fractions obtained in the distillation of tar, drip oil and medium and low temperature condensates resulting from subjecting manufactured city gas such as carburetted water gas, oil gas, or coal gas to refrigeration.

While a particular method of obtaining soluble polycyclopentadiene has been specifically set forth, it is to be understood that soluble polycyclopentadiene obtained from any other sources may be employed without departing from the invention.

Although in the examples given a dilute solution of polycyclopentadiene is used in the preparation of my new resin, it is to be understood that any desired concentration may be employed including highly concentrated solutions as well as solid polycyclopentadiene.

Likewise, monomeric styrene from any other source than light oil, such as drip oil, coal tar, cracked petroleum products, and synthetic styrene, may be employed without departing from the invention. Such styrene may be in any concentration up to and including 100%, though the polymerization of styrene with polycyclopentadiene is usually carried on in the presence of a common solvent which acts as diluent.

When light oil is the source of styrene the crude fractions may have any reasonable boiling range. For instance, light oil styrene fractions may have a boiling range of from 125° C. to 165° C. or wider, although I prefer to use light oil styrene fractions with boiling ranges which do not greatly exceed 140° C. to 150° C.

Excellent results are obtained when using light oil styrene fractions with boiling ranges not exceeding 142° C. and 148° C.

Another source of styrene is the product resulting from the dehydrogenation of ethyl benzene.

It is to be understood that the above specific examples are by way of illustration and that changes, omissions, additions, substitutions, and/or modifications might be made within the scope of the claims without departing from the spirit of the invention.

I claim:

1. A process comprising polymerizing soluble polycyclopentadiene with monomeric styrene.

2. A process comprising heat polymerizing soluble polycyclopentadiene with monomeric styrene.

3. A process comprising catalytically polymerizing soluble polycyclopentadiene with monomeric styrene.

4. A process comprising preparing a mixture containing the substances soluble catalytically polymerized cyclopentadiene and monomeric styrene in the ratio on the undiluted basis of from 50% to 99% of either of said substances to from 1% to 50% of the other of said substances, and then subjecting said mixture to heat polymerization.

5. A process comprising preparing a mixture containing the substances soluble catalytically polymerized cyclopentadiene and monomeric styrene in the ratio on the undiluted basis of from 85% to 95% of either of said substances to from 5% to 15% of the other of said substances, and then subjecting said mixture to heat polymerization.

6. A process comprising mixing soluble catalytically polymerized cyclopentadiene, monomeric styrene and a mutual solvent, and then subjecting said mixture to a temperature between 75° C. and 200° C. for a sufficient length of time to copolymerize said soluble catalytically polymerized cyclopentadiene with said monomeric styrene.

7. As a new resinous composition the product of the polymerization of soluble polycyclopentadiene with monomeric styrene.

8. As a new resinous composition the product of the heat polymerization of soluble catalytically polymerized cyclopentadiene with monomeric styrene.

9. As a new resinous composition the product of the polymerization of from 50% to 95% soluble catalytically polymerized cyclopentadiene with from 5% to 50% monomeric styrene.

10. As a new resinous composition the product of the polymerization of from 50% to 95% monomeric styrene with from 5% to 50% soluble catalytically polymerized cyclopentadiene.

11. As a new resinous composition the product of the polymerization of from 85% to 95% soluble catalytically polymerized cyclopentadiene with from 5% to 15% monomeric styrene.

12. As a new resinous composition the product of the polymerization of from 85% to 95% monomeric styrene with from 5% to 15% soluble catalytically polymerized cyclopentadiene.

13. A liquid coating composition comprising a solution in a solvent of the resin made by the process defined in claim 1.

14. A liquid coating composition containing the resin made by the process defined in claim 1.

FRANK J. SODAY.